(12) United States Patent
Romano

(10) Patent No.: US 7,804,819 B2
(45) Date of Patent: Sep. 28, 2010

(54) METHOD FOR IMPLEMENTING VOICE OVER IP THROUGH AN ELECTRONIC DEVICE CONNECTED TO A PACKED SWITCHED NETWORK

(75) Inventor: Fabio Romano, Napoli (IT)

(73) Assignee: Incard SA, Geneva (CH)

(*) Notice: Subject to any disclaimer, the term of this patent is extended or adjusted under 35 U.S.C. 154(b) by 370 days.

(21) Appl. No.: 11/753,846

(22) Filed: May 25, 2007

(65) Prior Publication Data

US 2007/0291753 A1 Dec. 20, 2007

(30) Foreign Application Priority Data

May 26, 2006 (EP) .................. 06010815

(51) Int. Cl.
*H04L 12/66* (2006.01)
(52) U.S. Cl. .................. 370/352
(58) Field of Classification Search .......... 370/352, 370/412; 704/203; 375/240.2; 709/203
See application file for complete search history.

(56) References Cited

U.S. PATENT DOCUMENTS

| | | | | |
|---|---|---|---|---|
| 7,072,832 | B1* | 7/2006 | Su et al. | 704/230 |
| 2005/0049853 | A1 | 3/2005 | Lee et al. | 704/201 |
| 2005/0147085 | A1* | 7/2005 | Eguchi et al. | 370/352 |
| 2006/0146805 | A1* | 7/2006 | Krewson | 370/352 |
| 2007/0058652 | A1* | 3/2007 | Hahn et al. | 370/412 |
| 2007/0071091 | A1* | 3/2007 | Lay et al. | 375/240.2 |
| 2007/0225971 | A1* | 9/2007 | Bessette | 704/203 |
| 2007/0263600 | A1* | 11/2007 | Sutardja et al. | 370/352 |
| 2007/0294333 | A1* | 12/2007 | Yang et al. | 709/203 |

FOREIGN PATENT DOCUMENTS

| | | |
|---|---|---|
| GB | 2414713 | 12/2005 |
| WO | 95/03571 | 2/1995 |
| WO | 00/54529 | 9/2000 |
| WO | 2006/045031 | 4/2006 |

\* cited by examiner

*Primary Examiner*—Albert T Chou
(74) *Attorney, Agent, or Firm*—Lisa K. Jorgenson; Allen, Dyer, Doppelt, Milbrath & Gilchrist, P.A.

(57) ABSTRACT

A method for implementing Voice over IP through an electronic device including the phase of sampling a voice communication in a corresponding sampled communication; encoding the sampled communication into corresponding encoded data; decoding the corresponding encoded data into decoded data; and connecting the electronic device to a packed switched network for transmitting the corresponding encoded data. The method may include a phase for storing an encoder and a decoder inside a portable memory unit of the electronic device for executing the phase of encoding and decoding the sampled communication. The phase of storing the encoder and a decoder may be executed on a IC Card intended to be inserted in the electronic device.

25 Claims, 3 Drawing Sheets

METHOD FOR IMPLEMENTING VOICE OVER IP THROUGH AN ELECTRONIC DEVICE CONNECTED TO A PACKED SWITCHED NETWORK

FIELD OF THE INVENTION

The present invention relates to a method for implementing Voice over IP through an electronic device.

BACKGROUND OF THE INVENTION

As it is known, a method implementing Voice over IP transmits a voice communication over a network designed to support a data communication, usually known as a packet switched network. In a packet switched network a plurality of small units of data, usually known as packets, are routed between a sender electronic device and a receiver electronic device on the basis of a destination address, stored within each packet.

This type of communication between the sender and the receiver electronic device is known as a connectionless communication because each packet may follow a different route on the network before reaching the receiver device. More particularly, the Internet is based on the connectionless communication as described above.

A method implementing Voice over IP transmits the voice communication between the sender and the receiver electronic devices connected to a first and a second access point of a Packet switched network. The Internet, that is a Packet switched network used to transmit data communications may be adapted to support voice communications between two electronic devices, for example, located in different nations all over the world and connected to a first and a second access point of the Internet.

In fact, the data to be sent are previously divided in a plurality of packets by a sender electronic device, they are sent over the network and they are finally received by a receiver electronic device, wherein they are recomposed into the original data communication. More particularly, the method implementing Voice over IP is subject to the packet loss during the data communication, and a consequent bad audio quality of the voice communication may result from a high packet loss ratio of the corresponding data communication. In fact, the quality of a voice communication based on a real time voice communication is strictly linked to the percentage of packet loss and to the transmission delay due to the distance between the sender electronic device and the receiver one.

More particularly, experimental results prove that on the Internet the packet loss ratio is between the 0% and the 20%, with delays between 5 ms and 500 ms. Anyway, when the packet loss rate is over 10% and the delay is over the 150 ms the audio quality received at the destination device is considered unacceptable.

A reduction of the packet loss ratio may be achieved through an encoder that reduces the effect of the packet loss on the received data, reconstructing with higher fidelity the corresponding voice communication. More particularly, a known telephony company developed a method for implementing Voice over IP through a personal computer, at the same time reducing the packet loss ratio. This method comprises an encoder and a decoder intended to be installed on a sender personal computer for encoding a voice communication into a data communication at the sender side and, vice versa, for decoding the data communication into a voice communication at the receiver side. More particularly, the sender personal computer comprises a microphone wherein a first user may speak and a loudspeaker wherefrom the first user may hear the voice, for example, the voice of a second user in voice communication with him.

The second user is provided with a corresponding receiver personal computer comprising an encoder and a decoder for encoding the voice communication into a data communication at the sender side and, vice versa, for decoding the data communication into a voice communication at the receiver side. The receiver personal computer also comprises a respective microphone and loudspeaker.

When the first user speaks, the microphone samples his voice and forwards it to the encoder. The encoder processes the sampled voice and encodes it in a corresponding data communication ready to be sent over the Internet. The receiver personal computer of the second user receives through the Internet the data communication. The decoder installed on the receiver personal computer of the second user may process and decode the data communication into a corresponding voice communication, ready to be heard from the loudspeaker.

Such voice communication is less expensive with respect to a voice communication based on a traditional telephone network, like a circuit switched one, because it has the cost of an Internet connection. In addition, the use of a personal computer is not always possible to make a telephone call, being the personal computer, for example a notebook, not intended to be used as a mobile phone, especially for its size and weight.

At the same time, an access point to a packet switched Ethernet, like the Internet, is required to implement the voice communication according to the method described above, such an access point not being always available. Moreover, the hardware configuration of a personal computer not always includes a microphone and a loudspeaker, and the installation and use of a headphone as a peripheral device connected to the personal computer may not particularly appreciated by a user.

The method for implementing Voice over IP in a packet switched network requires that a personal computer or a notebook, provided with a microphone and a loudspeaker, be connected to an access point of the packet switched network. The use of such a personal computer as a mobile telephone may not always be possible because the access point to the packet switched network is not ubiquitous and the personal computer is not as portable as a mobile phone, especially for its size and weight.

SUMMARY OF THE INVENTION

An object of the present invention is to provide a method for implementing a voice over IP over a packet switched network using a telephone device, more particularly using a mobile phone that is able to reach the packet switched network and that may include an embedded microphone and a loudspeaker.

This and other objects are provided by a method for implementing Voice over IP through an electronic device comprising: sampling a voice communication in a corresponding sampled communication; encoding the sampled communication into corresponding encoded data; decoding the corresponding encoded data into decoded data; and connecting the electronic device to a packed switched network for transmitting the corresponding encoded data. The phases of encoding and decoding may be executed respectively by an encoder and a decoder stored inside a portable memory unit of the electronic device.

BRIEF DESCRIPTION OF THE DRAWINGS

Further characteristics and the advantages of the method implementing Voice over IP according to the present invention will be apparent from the following description of an embodiment thereof, made with reference to the annexed drawings, given for indicative and non-limiting purpose.

DETAILED DESCRIPTION OF THE PREFERRED EMBODIMENTS

Figure 1A:
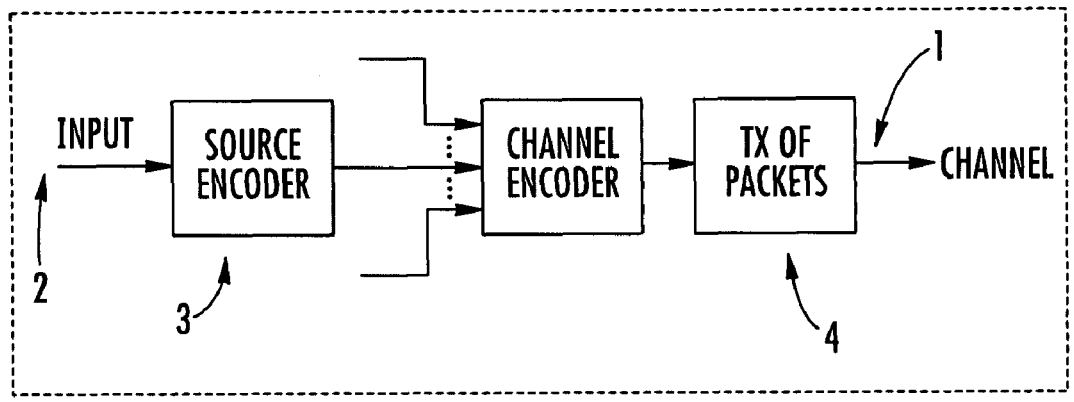
FIG. 1a schematically shows a phase of encoding a sampled communication in corresponding encoded data, according to the present invention.

With reference to FIG. 1a, a channel intended to be used for a voice communication is schematically represented and indicated with numeral reference 1. More particularly, the channel 1 belongs to a packed switched network and the transmission of the voice communication over such a network is driven by a method for implementing Voice over IP. The method provides that an electronic device is connected to the packed switched network, for example to an access point of the channel 1, and samples the voice of a user.

More particularly, the method for implementing Voice over IP comprises a phase for sampling the voice communication of the user in a corresponding sampled communication; a phase or step for encoding the sampled communication into corresponding encoded data; a phase for decoding the corresponding encoded data into decoded data; and wherein connection means or connection circuitry is provided to connect the electronic device to the packed switched network and for transmitting/receiving the corresponding encoded data over such a network.

Accordingly, the method for implementing Voice over IP comprises a phase for storing an encoder and a decoder inside a portable memory unit of the electronic device, such encoder and decoder being used respectively to execute the phase of encoding the sampled communication and the phase of decoding the corresponding encoded data in decoded data. More particularly, the encoder and the decoder are stored on a IC Card intended to be inserted into the electronic device.

In FIG. 1a the transmission of a voice communication from the electronic device over a channel 1 is represented where the input 2 is a voice communication sampled, for example, by a microphone connected or embedded inside the electronic device. The sampled voice is encoded through an encoder 2, for example stored inside an IC Card included inside the electronic device that is connected to an access point of the channel. When the sampled communication is encoded, it is transmitted from the electronic device to a second electronic device, for example, connected to a second access point of the packed switched network.

Figure 1B:
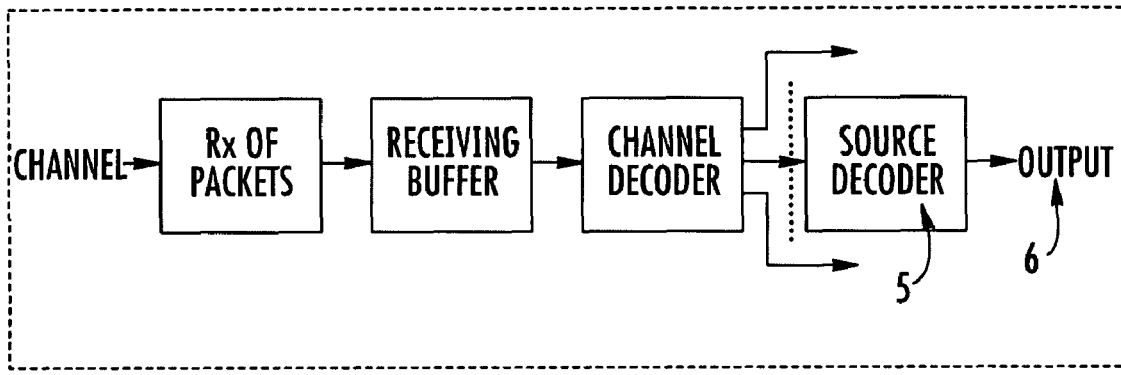
FIG. 1b schematically shows a phase of decoding the encoded data in corresponding decoded data, according to the present invention.

The method comprises a phase of decoding the encoded data into corresponding decoded data. In fact when the second electronic device receives through the packed switched network the encoded data, it decodes the data, through the corresponding decoder, into corresponding decoded data. As schematically shown by the block diagram of FIG. 1b, the received data is decoded through a decoder 5, for example, stored inside an IC Card inserted in the receiver electronic device. The original voice communication of the first user is reproduced by the second electronic device, sending the decoded data to a loudspeaker connected or embedded inside the second electronic device.

Figure 2A:
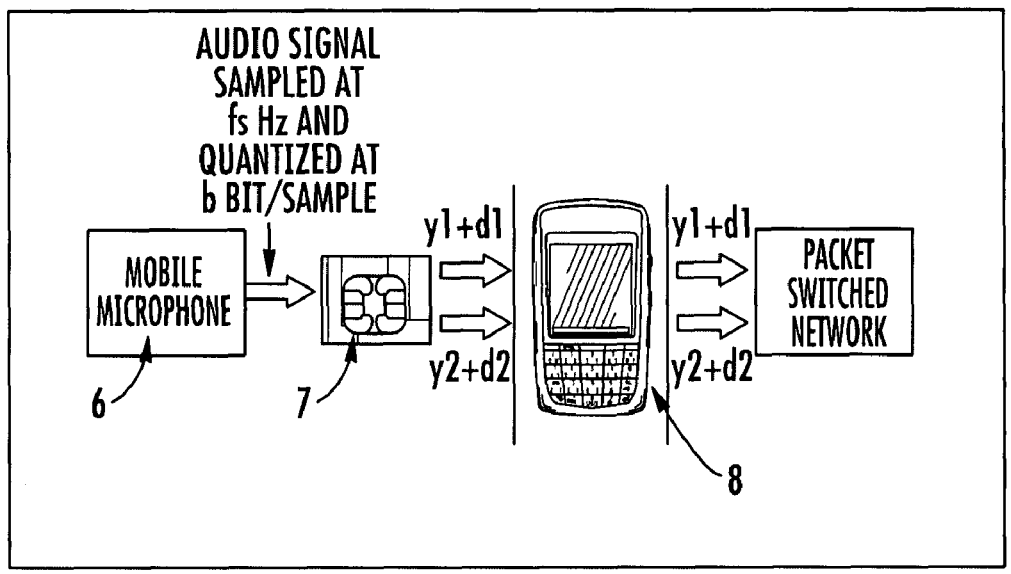
FIG. 2a schematically shows a phase of sampling a voice communication, the phase of encoding the sampled communication in corresponding encoded data and the phase of transmission of the corresponding encoded data, according to the present invention.

In FIG. 2a, there is schematically shown a microphone 6 used to sample the voice communication of a user in a sampled communication, and an IC card 7 storing the encoder for encoding the sampled communication into encoded data. The encoded data is transmitted by a mobile phone 8 hosting the IC Card 7.

Figure 2B:
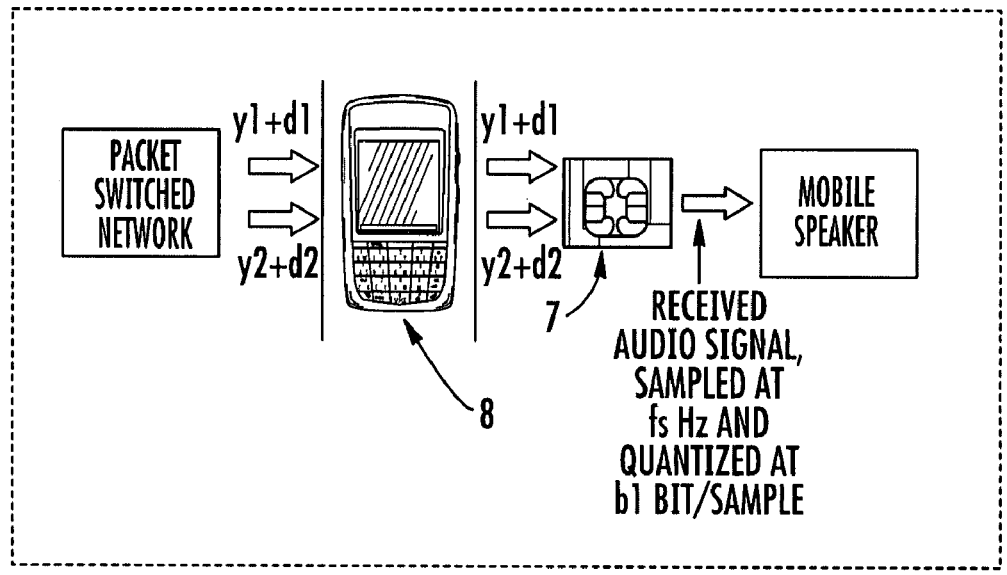
FIG. 2b schematically shows a phase of receiving encoded data, the phase of decoding the encoded data into decoded data and the phase of reproducing a voice communication from decoded data, according to the present invention.

With reference to FIG. 2b, when a second mobile phone 8 receives the encoded data through the packed switched network, it decodes it through a decoder stored inside an IC Card 7 and forwards it to the loudspeaker embedded in the mobile phone. More particularly, the phase of sampling samples the voice communication through specific mathematic processing and is intended to allow the precise reproduction of the voice communication after its transmission over the packet switched network.

Figure 3A:
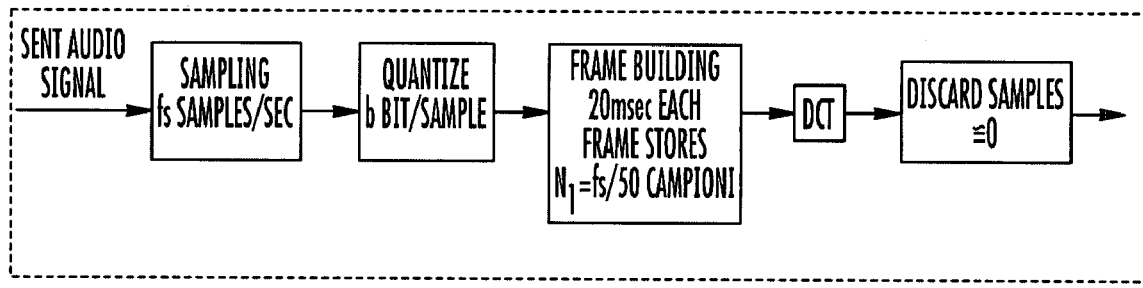
FIG. 3a schematically shows a phase of sampling a voice communication in a plurality of samples, their grouping in a frame and their encoding, according to the present invention.

As schematically shown in FIG. 3a, the phase of sampling, samples the voice communication at fs samples/sec and quantizes it at b bits/sample while the phase of encoding groups the quantized samples in frames, compacts each frame, divides it into two different descriptions, and encrypts it before sending. According to the method, the frame is transformed, for example, by a Discrete Cosine Transform (DCT) into a transformed frame comprising a plurality of transformed samples.

Figure 3B:
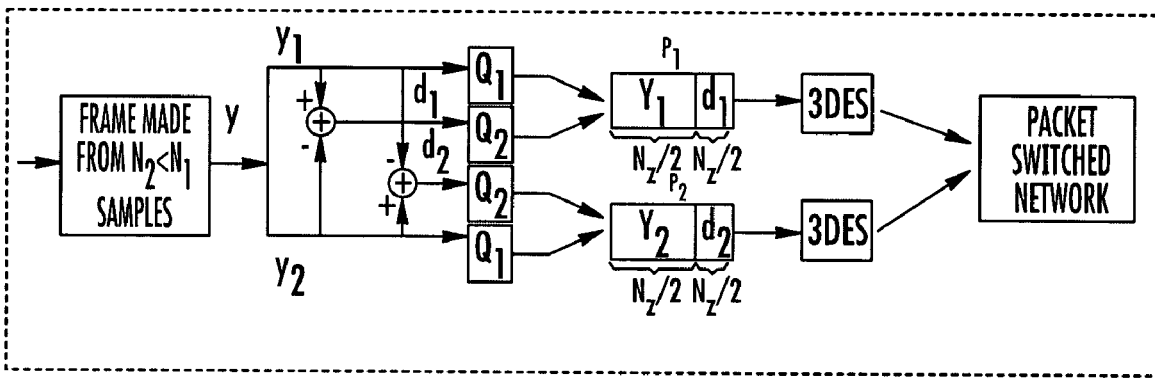
FIG. 3b schematically shows a division of the encoded frames in odd and even samples, their grouping in corresponding packets and the subsequent encryption, according to the present invention.

During the phase of encoding, one or more transformed samples that do not satisfy a condition are discarded. More particularly, those samples that are nearby to zero after the DCT are discarded without any loss in the audio quality. In fact the DCT is a unitary transform and the energy of the signal is preserved after the transformation. Accordingly, since after the transformation all of the signal is concentrated at low frequencies, the high frequencies that are nearby to zero may be cut. The transformed samples are grouped into a plurality of odd transformed samples y1 and into a plurality of even transformed samples y2, as schematically shown in FIG. 3b. More particularly, a first difference d1 is processed subtracting the plurality of even transformed samples y2 from the plurality of odd transformed samples y1 and a second difference d2 is processed subtracting the plurality of odd transformed samples y1 from the plurality of even transformed samples y2.

The first difference d1 and the odd transformed samples y1 are packed in a corresponding first packet structure p1, ready to be sent over the packed switched network. Also the second difference d2 and the even transformed samples y2 are packed in a corresponding second packet structure p2. More particularly, the first packet structure p1 and the second packet structure p2 are encrypted into encrypted packet structures before being transmitted over the packet switched network, for example, through a DES encryption.

Figure 4:
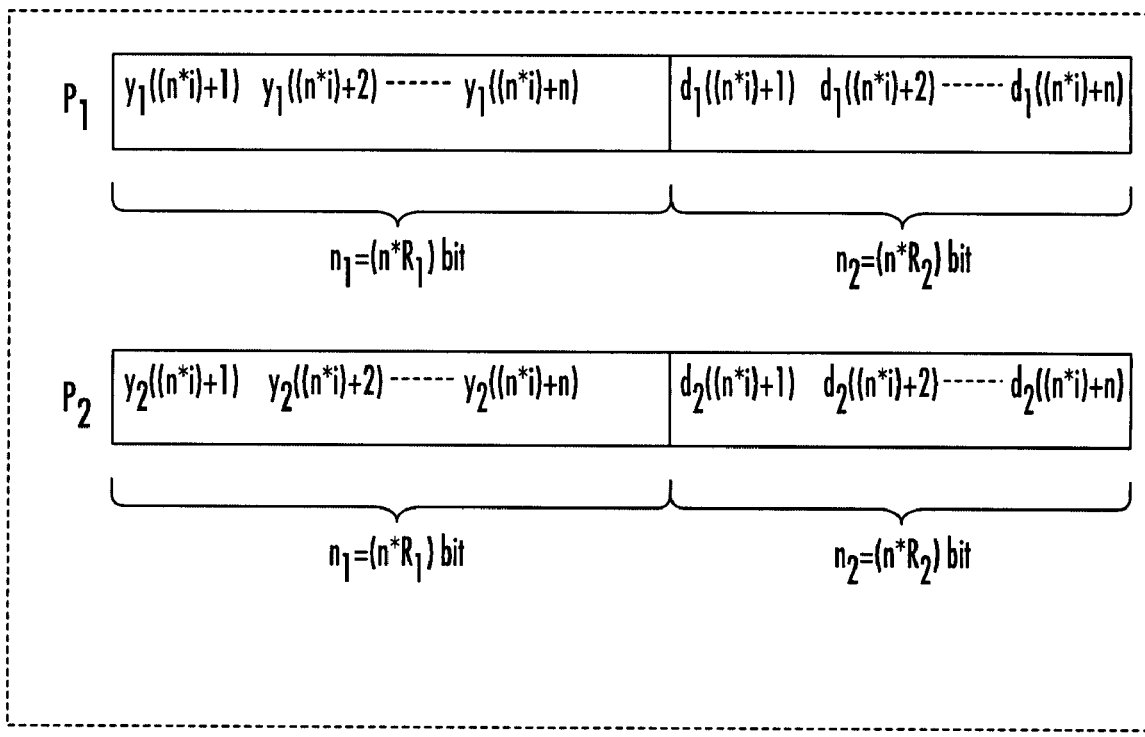
FIG. 4 schematically shows in more detail how the packets of FIG. 3b are built, comprising odd, even and difference samples, according to the present invention.

The encrypted packet structures p1 and p2, represented in major detail in FIG. 4, are transmitted over the packet switched network from the electronic device. When the second electronic device receives the encrypted packet structures p1 and p2, it decrypts them into a corresponding plurality of packet structures.

Figure 3C:
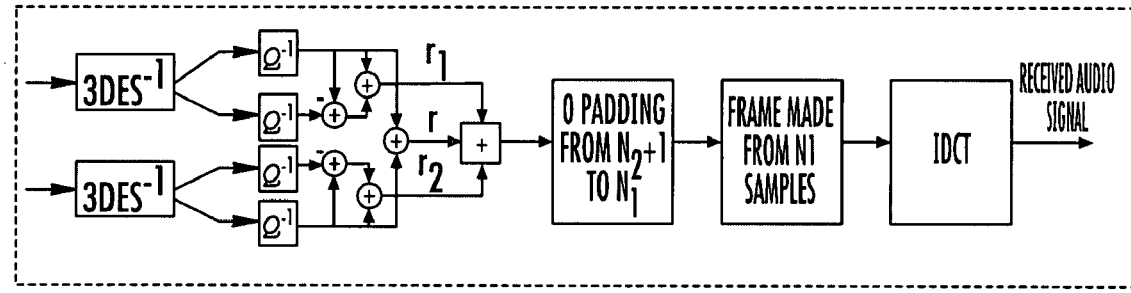
FIG. 3c schematically shows at the receiver side, the packet decryption and the reconstruction of the received signal, according to the present invention.

The phase of decoding, schematically represented in FIG. 3c, comprises the decrypting the encrypted data, for example, through a $DES^{-1}$ algorithm, and processing of a validity check for checking the validity of a transmitted packet. More particularly, the phase of decoding discards, from the corresponding plurality of packets, the first difference d1 and the second difference d2 when the validity check is positive. When the validity check is negative, the phase of decoding uses the first difference d1 and/or the second difference d2 to rebuild one or more of the plurality of packets that are not received correctly by the second electronic device.

With more specific reference to FIG. 4, an audio signal y is split into two flows: y1, made up of all the odd samples of y, and y2, made up of all the even samples of y. The first difference d1 and the second difference d2 are processed as explained above and two packets p1 and p2 are structured and ciphered before being sent on the network. At receiver side, the packets p1 and p2 are deciphered and sent to the decoder. More particularly, if p1 and p2 are received correctly, d1 and d2 are discarded and a frame r is built from interleaving of y1 and y2.

If only p1 is correctly received, a frame r1 is built from interleaving of y1 and the difference between y1 and d1. If only p2 is correctly received, a frame r2 is built from interleaving of the difference between y2 and d2 and y2. Finally, if both p1 and p2 are not received correctly, a silent frame may be inserted or replaced with white noise or replaced with the last correctly received packet.

Once the frame r, r1 or r2 is received a zero padding is performed before the Inverse Discrete Cosine Transformation. Advantageously, the method implementing Voice Over IP provides that a telephone device, a mobile phone or, more generally, an electronic devices with native embedded microphone and loudspeaker is used to transmit and receive a voice communication over a packet switched network. Advantageously, such electronic device is typically connectable to a packet switched network, for example, through the same antenna or connection used to reach a circuit switched network. Advantageously, when a packet switched network is not reachable by the antenna of the electronic device, it may support a voice communication over a reachable circuit switched network. Advantageously, a telephone device, for example, a cordless or a mobile phone, being that its size and weight are designed to be carried, may be used to reach a packet switched network.

An electronic device for implementing Voice over IP may comprise sampling means or a sampler for sampling a voice communication in a corresponding sampled communication; encoding means or an encoder for encoding the sampled communication in corresponding encoded data; and decoding means or a decoder for decoding the corresponding encoded data into decoded data. The electronic device also comprises means to be connected to a packed switched network for transmitting and receiving the corresponding encoded data.

The electronic device for implementing Voice over IP comprises a portable memory unit for storing the encoding and decoding means or an encoder and decoder. Advantageously, the portable memory unit is an IC Card intended to be hosted by the electronic device. Advantageously, the encoding and decoding means stored on the portable memory unit may be uploaded, and, for example, used to implement a Voice communication over IP through another electronic device, able to support a connection with such portable memory device. The electronic device implementing Voice over IP comprises sampling means or a sampler for sampling the communication. Advantageously, the sampling means is embedded inside the electronic device, for example, inside a telephone device or a mobile phone.

That which is claimed is:

1. A method for implementing voice over Internet Protocol through a mobile wireless communications device comprising:
   sampling a voice communication to generate a corresponding sampled communication;
   encoding the sampled communication into encoded data by at least
      grouping a plurality of samples from the voice communication in a frame,
      transforming the frame into a transformed frame comprising a plurality of transformed samples,
      grouping the plurality of transformed samples into at least a plurality of odd transformed samples and a plurality of even transformed samples, and
      processing first and second differences between the plurality of odd transformed samples and the plurality of even transformed samples, and the plurality of even transformed samples and the plurality of odd transformed samples, respectively;
   decoding the encoded data into decoded data; and
   connecting the mobile wireless communications device to a packed switched network for transmitting the encoded data;
   the encoding and decoding being executed respectively by an encoder and a decoder stored on an integrated circuit (IC) card inserted into the mobile wireless communications device.

2. The method according to claim 1 further comprising reproducing the voice communication from the transmitted encoded data on a loud speaker of the mobile wireless communications device.

3. The method according to claim 1 wherein the sampling comprises sampling the voice communication at a sampling frequency.

4. The method according to claim 3 wherein the encoding comprises processing a set value bit rate for each sample.

5. The method according to claim 1 wherein transforming the frame comprises transforming the frame with a Discrete Cosine Transform.

6. The method according to claim 1 wherein at least one of the plurality of transformed samples is discarded.

7. The method according to claim 1 further comprising packing the first difference and the plurality of odd transformed samples in a first packet structure.

8. The method according to claim 7 further comprising packing the second difference and the plurality of even transformed samples in a second packet structure.

9. The method according to claim 8 further comprising encrypting the first packet structure and the second packet structure into encrypted packet structures before being transmitted over the packet switched network.

10. The method according to claim 9 further comprising transmitting the encrypted packet structures over the packet switched network.

11. The method according to claim 10 further comprising decrypting the encrypted packet structures into a corresponding plurality of packets after transmission over the packet switched network.

12. The method according to claim 11 wherein the decoding further comprises processing a validity check for checking a validity of the transmitted plurality of packets; and wherein a positive value of the validity check corresponds to a correctly transmitted packet.

13. The method according to claim 12 wherein the decoding comprises discarding, from the corresponding plurality of packets, the first difference and the second difference when the validity check is positive.

14. The method according to claim 12 wherein the decoding comprises using at least one of the first difference and the second difference to rebuild at least one packet of the plurality of packets when the validity check is not positive.

15. A mobile wireless communications device for implementing voice over Internet Protocol comprising:
    a sampler configured to sample a voice communication to generate a corresponding sampled communication;
    an encoder configured to encode the sampled communication into encoded data by at least
        grouping a plurality of samples from the voice communication in a frame,
        transforming the frame into a transformed frame comprising a plurality of transformed samples,
        grouping the plurality of transformed samples into at least a plurality of odd transformed samples and a plurality of even transformed samples, and
        processing first and second differences between the plurality of odd transformed samples and the plurality of even transformed samples, and the plurality of even transformed samples and the plurality of odd transformed samples, respectively;
    a decoder for decoding the encoded data into decoded data;
    connection circuitry for connecting to a packed switched network; and
    an integrated circuit (IC) card for storing said encoder and said decoder.

16. The mobile wireless communications device according to claim 15 further comprising a loud speaker for reproducing the voice communication.

17. The mobile wireless communications device according to claim 15 wherein said sampler comprises an embedded device.

18. The mobile wireless communications device according to claim 15 wherein said connection circuitry comprises a cellular telephone transceiver.

19. An integrated circuit (IC) card for cooperating with a mobile wireless communications device for sampling a voice communication to generate a corresponding sampled communication, for encoding the sampled communication into encoded data, for decoding the encoded data into decoded data, and for connecting to a packed switched network, the IC card comprising:
    a memory configured to store an encoder and a decoder; and
    a processor coupled to said memory and configured to execute the encoding and the decoding, the encoding including
        grouping a plurality of samples from the voice communication in a frame,
        transforming the frame into a transformed frame comprising a plurality of transformed samples,
        grouping the plurality of transformed samples into at least a plurality of odd transformed samples and a plurality of even transformed samples, and
        processing first and second differences between the plurality of odd transformed samples and the plurality of even transformed samples, and the plurality of even transformed samples and the plurality of odd transformed samples, respectively.

20. The IC card according to claim 19 wherein the mobile wireless communications device comprises a cellular telephone.

21. The IC card according to claim 19 wherein the mobile wireless communications device comprises a loud speaker for reproducing the voice communication.

22. The IC card according to claim 19 wherein the mobile wireless communications device comprises an embedded sampler.

23. A method for implementing voice over Internet Protocol through an electronic device comprising:
    sampling a voice communication to generate a corresponding sampled communication;
    encoding the sampled communication into encoded data by at least
        grouping a plurality of the samples from the voice communication into a frame,
        transforming the frame into a transformed frame comprising a plurality of transformed samples,
        grouping the plurality of transformed samples into at least a plurality of odd transformed samples and a plurality of even transformed samples, and
        processing first and second differences between the plurality of odd transformed samples and the plurality of even transformed samples, and the plurality of even transformed samples and the plurality of odd transformed samples, respectively;
    decoding the encoded data into decoded data;
    connecting the electronic device to a packed switched network for transmitting the encoded data;
    the encoding and decoding being executed respectively by an encoder and a decoder stored on a portable memory unit associated with the electronic device; and
    using at least one of the first difference and the second difference to rebuild the encoded data at a receiver device.

24. The method according to claim 23 further comprising reproducing the voice communication from the transmitted encoded data on a loud speaker of the electronic device.

25. The method according to claim 23 further comprising processing a second difference between the plurality of even transformed samples and the plurality of odd transformed samples.

* * * * *

UNITED STATES PATENT AND TRADEMARK OFFICE
CERTIFICATE OF CORRECTION

| | | |
|---|---|---|
| PATENT NO. | : 7,804,819 B2 | |
| APPLICATION NO. | : 11/753846 | |
| DATED | : September 28, 2010 | |
| INVENTOR(S) | : Romano | |

It is certified that error appears in the above-identified patent and that said Letters Patent is hereby corrected as shown below:

| | |
|---|---|
| Cover Page, Title | Delete: "PACKED"<br>Insert: --PACKET-- |
| Cover Page, Abstract Line 12 | Delete: "a IC"<br>Insert: --an IC-- |
| Column 1, Line 3 | Delete: "PACKED"<br>Insert: --PACKET-- |
| Column 2, Line 38 | Delete: "not particularly"<br>Insert: --not be particularly-- |
| Column 2, Line 63 | Delete: "packed"<br>Insert: --packet-- |
| Column 3, Line 44 | Delete: "packed"<br>Insert: --packet-- |
| Column 3, Line 48 | Delete: "packed"<br>Insert: --packet-- |
| Column 3, Line 57 | Delete: "packed"<br>Insert: --packet-- |
| Column 3, Line 67 | Delete: "a IC"<br>Insert: --an IC-- |
| Column 4, Line 11 | Delete: "packed"<br>Insert: --packet-- |

Signed and Sealed this
Twelfth Day of July, 2011

David J. Kappos
*Director of the United States Patent and Trademark Office*

CERTIFICATE OF CORRECTION (continued)
U.S. Pat. No. 7,804,819 B2

| | |
|---|---|
| Column 4, Line 14 | Delete: "packed"<br>Insert: --packet-- |
| Column 4, Line 31 | Delete: "packed"<br>Insert: --packet-- |
| Column 4, Line 66 | Delete: "packed"<br>Insert: --packet-- |
| Column 5, Line 13 | Delete: "comprises the decrypting"<br>Insert: --comprises decrypting-- |
| Column 5, Line 36 | Delete: "and y2" |
| Column 5, Line 45 | Delete: "devices"<br>Insert: --device-- |
| Column 5, Line 65 | Delete: "packed"<br>Insert --packet-- |
| Column 6, Line 38 | Delete: "packed"<br>Insert: --packet-- |
| Column 7, Line 42 | Delete: "packed"<br>Insert: --packet-- |
| Column 8, Line 33 | Delete: "of the samples"<br>Insert: --of samples-- |
| Column 8, Line 46 | Delete: "packed"<br>Insert: --packet-- |